United States Patent
Luce

(10) Patent No.: US 7,257,998 B2
(45) Date of Patent: Aug. 21, 2007

(54) ASSEMBLY FOR ATTACHING A DETECTION UNIT, IN PARTICULAR FOR DETECTING TYRE PRESSURE, TO A RIM

(75) Inventor: Dominique Luce, Toulouse (FR)

(73) Assignee: LDL Technology, Toulouse (FR)

( * ) Notice: Subject to any disclaimer, the term of this patent is extended or adjusted under 35 U.S.C. 154(b) by 7 days.

(21) Appl. No.: 11/247,317

(22) Filed: Oct. 11, 2005

(65) Prior Publication Data
US 2006/0075812 A1    Apr. 13, 2006

(30) Foreign Application Priority Data
Oct. 12, 2004    (FR)    ................... 04 10767

(51) Int. Cl.
 *B60C 23/02*    (2006.01)
(52) U.S. Cl. .................................... 73/146.8
(58) Field of Classification Search ............... 73/146.8, 73/146, 146.4, 146.5
See application file for complete search history.

(56) References Cited

U.S. PATENT DOCUMENTS

| | | | |
|---|---|---|---|
| 4,843,872 A * | 7/1989 | Hebert et al. ............... | 73/146.5 |
| 5,844,131 A | 12/1998 | Gabelmann et al. | |
| 6,055,855 A | 5/2000 | Straub | |
| 6,462,650 B1 * | 10/2002 | Balzer et al. ............... | 340/442 |
| 6,851,308 B2 * | 2/2005 | Fonteneau .................. | 73/146 |
| 2003/0079537 A1 * | 5/2003 | Luce ........................... | 73/146 |
| 2003/0121317 A1 * | 7/2003 | Luce ........................... | 73/146 |
| 2005/0126704 A1 * | 6/2005 | Wacker ................... | 156/307.7 |

FOREIGN PATENT DOCUMENTS

| | | |
|---|---|---|
| FR | 2 834 245 | 7/2003 |
| JP | 2003 146035 A | 5/2003 |

* cited by examiner

*Primary Examiner*—Edward Lefkowitz
*Assistant Examiner*—Andre J. Allen
(74) *Attorney, Agent, or Firm*—Akerman Senterfitt; Peter A. Chiabotti

(57) ABSTRACT

An assembly (M) of a detection unit (100) for placement inside a tire with a rim having a connection aperture (210) is provided. The assembly (M) can include a detection unit (100) for receiving detection components, a valve body (300), a seal (400) for providing a seal between the valve body (300) and the rim (200), and fastener (500) for holding the valve body (300) in position on the rim (200). One or more of the detection unit (100), the valve body (300), the fastener (500) for holding the valve body (300), or a combination thereof, is preformed to penetrate the connection aperture (210) so as to engage the connection aperture (210) when the assembly (M) is subjected to tangential stresses.

14 Claims, 4 Drawing Sheets

ASSEMBLY FOR ATTACHING A DETECTION UNIT, IN PARTICULAR FOR DETECTING TYRE PRESSURE, TO A RIM

BACKGROUND OF THE INVENTION

1. Field of the Invention

This invention relates to the field of detecting parameters such as the pressure or temperature inside a tyre, and more specifically to variations enabling the detection unit to be attached to the wheel rim under optimal conditions.

2. Related Art of the Invention

There are several solutions in the prior art for attaching a detection unit. These solutions include the one adopted by the invention, which involves attaching, inside the rim, the detection unit which contains sensors corresponding to the parameters to be monitored, to the tyre inflation valve body.

The applicant has noted that the implementations of this attachment solution known in the prior art have certain disadvantages, as described below.

American documents U.S. Pat. No. 6,055,855 and 5,844,131 propose attaching a detection unit inside a tyre by means of a valve body, which involves an attachment assembly in which said body is preformed at a first end to pivotably receive the unit and at its second end to enable a fixing nut to be screwed. The valve body is also preformed on its internal portion, with a shoulder on which an elastomer seal is arranged so that the screwing action of the nut coming into contact with the external surface of the rim enables the shoulder to move toward the internal surface of the rim, thus fixing the elastomer seal against said surface. The elastomer seal is preformed to penetrate the aperture made in the rim to enable the attachment of the valve and to be inserted in this aperture between the valve body and the rim. The screwing action also ensures that said unit is urged against the internal surface of the valve.

This embodiment has several disadvantages noted by the applicant, including the following:

When the wheel rotates at high speed, the valve body is subjected to very high stresses which are transferred to the seal placed between the body and the rim. However, the lifetime of an elastomer sealing element which is not designed to withstand such stress is considerably reduced, leading to pressure loss and failure.

The seal is urged against the internal surface of the rim, which in most cases has a surface planarity capable of damaging the seal and/or reducing its sealing ability.

As the seal is an integral part of the attachment assembly, the screwing force must be adjusted and not exceed a threshold beyond which the seal would be damaged. However, this controlled screwing is not always respected.

Moreover, insofar as the screwing force is performed as prescribed, the presence of the fixing nut at the exterior makes unintentional unscrewing very easy.

As it is simultaneously subjected to the screwing pressure, tangential forces due to the rotation of the wheel, and the pressure and temperature of the tyre, the seal is subjected to a phenomenon of creep, in which its internal portion is dilated and the part inserted between the cylindrical surface of the valve and the cylindrical surface of the aperture made in the rim for receiving said valve is compressed.

By urging the unit against the rim, the latter is subjected to the temperature of the rim.

Such an assembly is suitable for an attachment to an automobile wheel rim in which the valve is not present in the plane of symmetry of the rim.

A modification is described in the French document FR2834245 which, on the basis of the same attachment principle, has the advantage of proposing a valve body with an internal shoulder against which the elastomer seal is positioned, with the latter being preformed so as to form a mechanical stop opposing the screwing force of the external nut so that the screwing force exerted on the seal does not exceed the threshold value, beyond which it will be damaged. Although this assembly proposes a solution to one of the problems of the prior art, it retains the other disadvantages described above.

In addition, another disadvantage found in the prior art relates to the unit itself which, for reasons of sealing and holding the components that it receives in position, is conventionally filled with a plastic material that increases the weight of the unit and makes it impossible to recycle it. The speeds and accelerations to which the unit is subjected make any additional mass become an additional stress transferred to the assembly for attaching the unit to the valve and consequently to the seal in the solutions of the prior art.

SUMMARY OF THE INVENTION

Based on this fact, the applicant has conducted research on a device for mounting a detection unit which eliminates the disadvantages of the prior art.

Thus, an objective of this research is to propose and assembly in which the seal between the valve and the rim is less subject to the tangential and radial forces caused by acceleration, rotation speed and the mass of the assembly and the unit.

Another aim of this research is to propose an assembly in which, while allowing the dilation and compression of the seal, the latter is less subject to screwing forces.

Another aim of this research is to provide an assembly that is difficult to dismantle from the outside (anti-vandalism function).

Another aim of this research is to provide an assembly that fits the rims of non-four-wheel vehicles.

This research has led to the design of an assembly for a detection unit in a tyre that is attached to the body of a valve and including the following elements:

a detection unit receiving detection components, a valve body, sealing means providing a seal between the valve body and the rim, means for holding the valve body in position on the rim preformed with a connection aperture provided for this purpose, a module for connecting the detection unit to the valve body. This assembly is remarkable in that at least one of the elements of said mounting, aside from the sealing means, is preformed so that a portion of this element penetrates the linking aperture so as to engage it when the assembly is subjected to tangential stresses.

This feature satisfies the objectives of the invention by proposing a mechanical stop that bears the tangential forces. Consequently, the seal is no longer subjected to all of the stresses due to the mass of the assembly and the speed and accelerations transferred onto the latter. The tangential forces can be borne by any element of the assembly except of course for the seal which is the element that, owing to its function, must be preserved. According to the configurations, the position holding means and the connection module can be implemented in a single subassembly.

According to a preferred feature, said sealing means are in contact with the external surface of the rim. This position of the seal outside the rim has several advantages, including the following:

it prevents the latter from being directly subjected to the temperature conditions in the tyre, it enables it to benefit from the external surface of the rim which provides greater planarity than that defined by the internal surfaces of the rim, it enables, when the aperture through which the valve passes is located on a surface of the rim almost parallel to the wheel tread, to exploit the effects of the centrifugal force on the seal, which tend to improve the urging of the seal into the zones that must be provided with a seal.

According to another particularly advantageous feature of the invention, said valve body includes an external shoulder with which said seal comes into contact, in which the means for holding the valve in position are placed inside and come into contact (directly or indirectly) with the internal surface of the rim, to hold the seal securely between the aperture and the valve body.

This feature means that the position holding means are inside the rim, making it very difficult to unintentionally dismantle the valve. These position holding means can consist of a nut, a "quarter-turn" attachment, a snap-on installation, crimping, riveting, and so on. In addition, the shoulder will protect the seal.

Said position holding means preferably consist of a threaded connection between the valve body and a nut that, coming into contact with the internal surface of the rim, holds, by means of a relative rotation of the threaded body with respect to the nut, the seal securely between the aperture and the valve body.

According to another particularly advantageous feature of the invention, said shoulder is preformed so as to create an axial contact surface against the surface of the rim and opposing the screwing forces and a receiving space in which the seal can be deformed in particular so as to manage the assemblies on various rim thicknesses. This feature has the advantage of preventing the screwing force applied in order to attach the valve body from damaging the seal. Thus, beyond a screwing threshold, the seal no longer constitutes a separating element in the assembly attaching the valve body on the rim since the contact surface then comes into contact with the rim.

To reduce the stresses that may be exerted on the assembly of the invention, and, in general, any valve to which a detection unit is connected, the applicant has conducted research on the unit in particular so as to make it lighter. This research led to the design of a unit that does not require the presence of a polymer material, thereby considerably reducing its mass.

As the basic concepts of the invention have been described above in their most general form, other details and features will become more clear from the following description and in reference to the appended drawings, given as non-limiting examples of several embodiments of an assembly according to the invention.

DETAILED DESCRIPTION OF THE INVENTION

Figure 1:
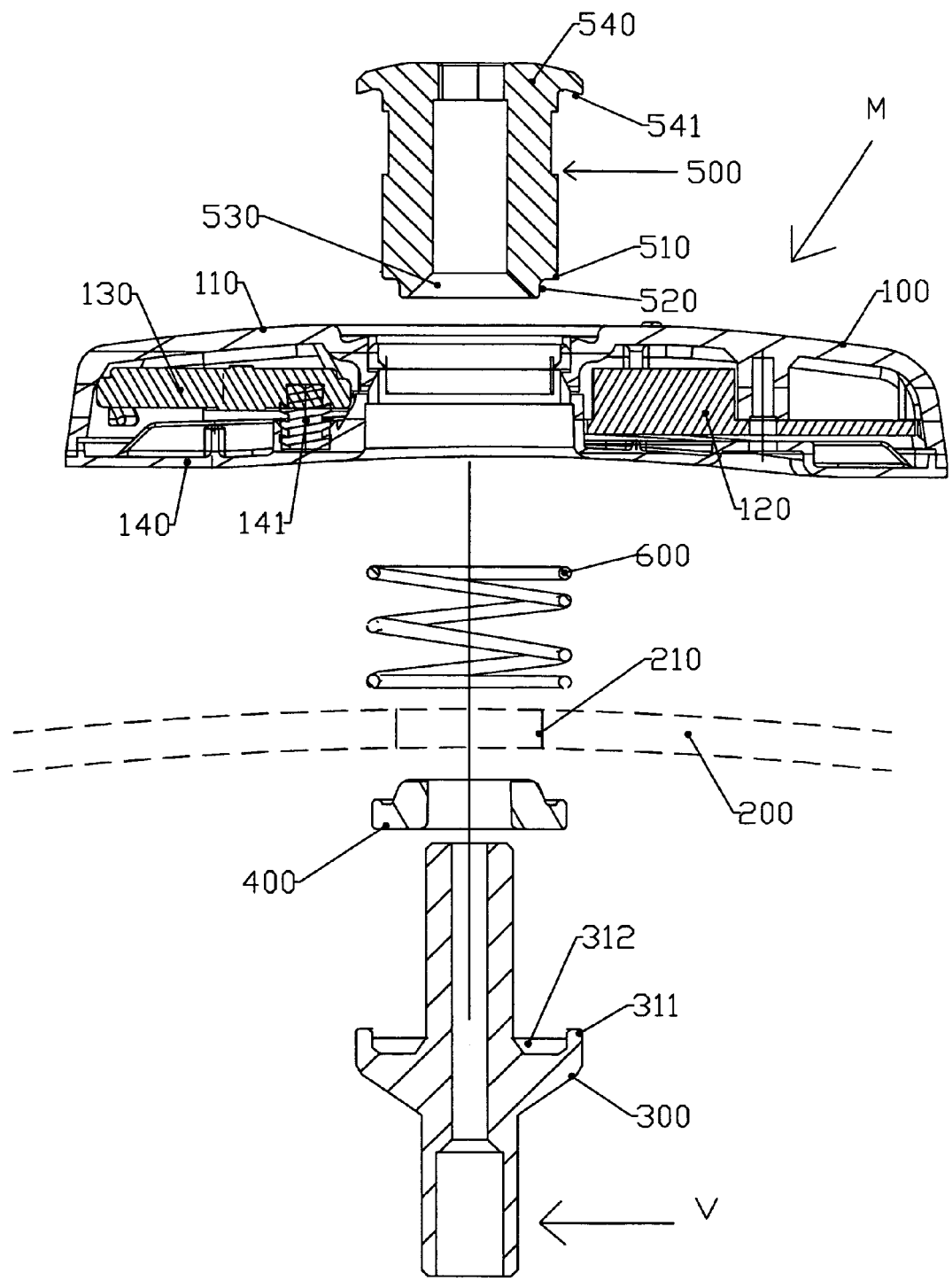
FIG. 1 is a diagram drawing of a front exploded cross-section view of the elements forming a first embodiment of an assembly according to the invention.
Figure 2:
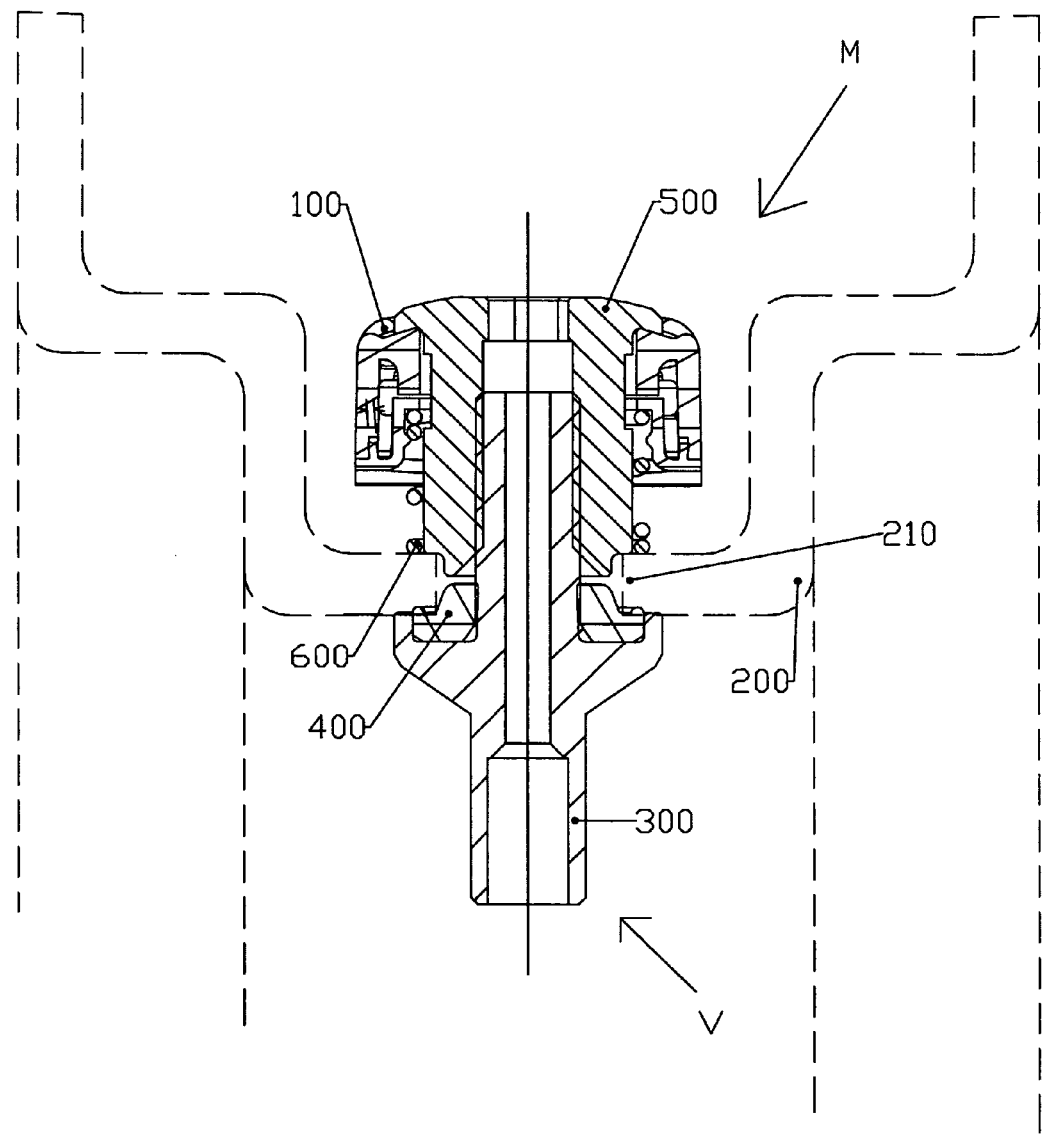
FIG. 2 is a diagram drawing of a side cross-section view of the assembly shown in FIG. 1.
Figure 4:
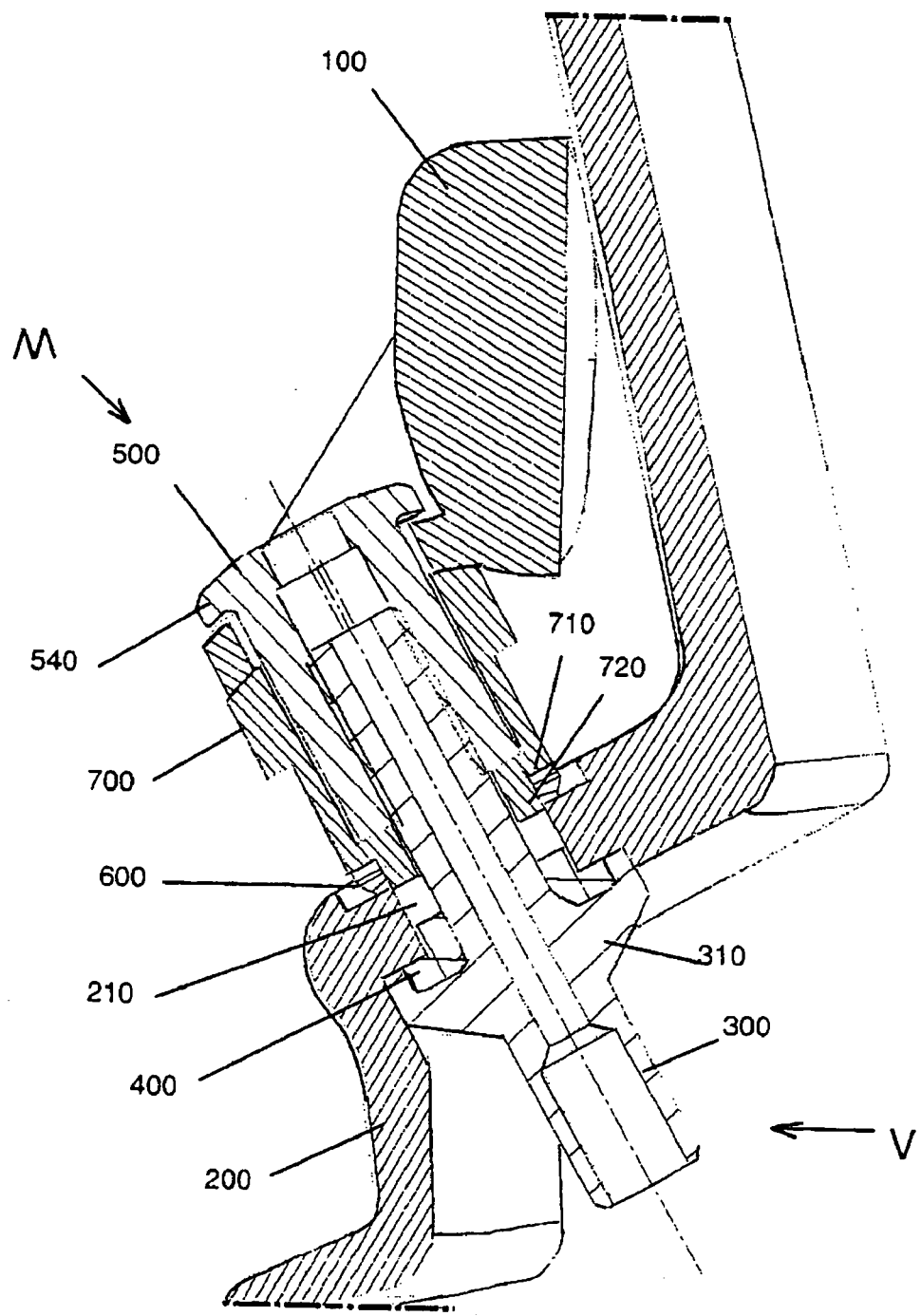
FIG. 4 is a diagram drawing of a front cross-section view of a second embodiment of the assembly according to the invention.

As shown in the drawing of FIGS. 1, 2 and 4, the assembly referenced M in its entirety of a detection unit 100 on a rim referenced 200 and represented by short broken lines is attached to the body 300 of a valve referenced V.

This assembly M includes the following elements:

a detection unit 100 receiving detection components and the elements necessary for their operation, a valve body 300, sealing means 400 providing a seal between the valve body 300 and the rim 200, means 500 for holding the position of the valve body 300 on the rim 200 preformed with an aperture 210 allowing the valve body 300 to pass through, a connection module, which, according to the embodiment shown, partially merges with the position holding means 500, for connecting the detection unit 100 to the valve body 300.

According to the invention, the assembly is remarkable in that the means 500 both holding the body 300 in position and connecting the body 300 with the unit 100 are preformed so that a portion of this element penetrates the aperture 210 provided in the rim 200. Thus, when the rim 200 is subjected to a high rotation speed and great accelerations, this element portion comes into contact with the cylindrical surface of the aperture 210 and bears the tangential stresses instead of the seal 400. This cylindrical penetration capable of having a clearance fit enables the assembly to be centred with respect to the axis of the aperture 210.

Said valve body 300 includes an external shoulder 310 with which said seal 400 comes into contact, with the latter being inserted at the level of the aperture 210 between the rim 200 and the valve body 300. The means 500 for holding the body 300 of the valve V in position consist of a threaded connection forming a nut which, coming into contact with the internal surface of the rim 200, holds, by means of a relative rotation of the threaded rod formed by the valve body 300 with respect to the nut 500, the seal 400 securely between the aperture 210 and the valve body 300.

According to a particularly advantageous technical option, the lower portion of the element 500 forming a nut is preformed not only to have an axial contact surface 510 for holding in position the body 300 on which it is screwed, but also to have a radial contact surface 520 for cylindrical penetration into the aperture 210. As shown, this cylindrical penetration does not exceed the thickness of the rim 200 so as to leave a free space inside the cylinder defined by the aperture 210 for the dilation of the seal. The length of this penetration is chosen so as to fit any rim thickness.

In addition, the end of the element 500 which is inserted into the aperture is preformed with a free receiving space 530 in which the seal 400 can dilate. To do this, according to the embodiment shown, the end of the element penetrating the aperture 210 provided in the rim is chamfered at the level of its internal aperture.

Moreover, said shoulder 310 externally defined by the valve body 300 is preformed so as to create an axial contact surface 311 against the surface of the rim 200 and opposing the screwing forces and a receiving space 312 in which the seal 400 can dilate.

According to the connecting solution shown and consistent with the invention, the module for connecting the unit 100 with the valve body 300 partially merges with the means for holding the position 500. In addition, the threaded sleeve 500 which provides these two functions passes through said unit 100 and advantageously includes a head 540 with a shoulder 541 which acts as a contact surface for said unit 100. This sleeve is threaded so as to screw on the threaded rod formed by the valve body 300. This sleeve 500 is preformed at the level of the top portion of its head 540 so as to allow its rotation with a tool, from the inside of the rim. According to a preferred embodiment, this preformation consists of a recess with a hex-head profile in order to allow its actuation by using a corresponding key. The valve body 300 is untouched by any surface capable of causing it to rotate.

In addition, the connection module M also includes resilient means 600 for holding the unit 100 against the head 540 by being inserted between the internal surface of the rim 200 and the lower portion of the unit. The presence of these resilient means 600 used in the embodiment shown with a spring has several advantages, including the following:

According to a suitable length of the threaded sleeve 500, it holds the unit 100 in a position away from the internal surface of the rim, providing a separating air space which acts as thermal insulation, thus promoting good operation of the detection means.

It holds the unit in position against the head for positioning the connection means so as to prevent any vibration or movement due to the necessary assembly clearance.

It allows the movement in the low position of the unit against the internal surface of the rim, a movement that is necessary when mounting the tyre on the rim.

It prevents the holding means from being loosened.

Finally, it provides these functions in spite of the variations in the lugs capable of changing depending on the type of rim.

It is important to note that in the assembly as proposed in this embodiment, the attachment of the valve body 300 to the rim 200 does not interfere in the stacking of flexible or deformable elements. Indeed, the rotation of the threaded sleeve 500 causes its lower portion to come into contact with the internal surface of the rim 200 and the aforementioned shoulder 310 of the valve body 300 to come into contact with the external surface of the rim 200. Thus, the assembly of the invention enables the attachment to be optimised while taking advantage of the functional resiliency of some of these elements.

According to a feature not shown, to prevent rotation or an angular displacement of the unit 100 with respect to the threaded sleeve which passes therethrough, said head 540 is preformed at the level of its surface 541 in contact with the unit 100 so as to propose a corrugated portion cooperating with notches formed in the unit 100 so as to limit, in combination with the resilient means 100, the rotational movements of the unit with respect to said sleeve. This "notching" has another function, which is to prevent the rotation or angular displacement of the threaded sleeve with respect to the unit.

Figure 3A:
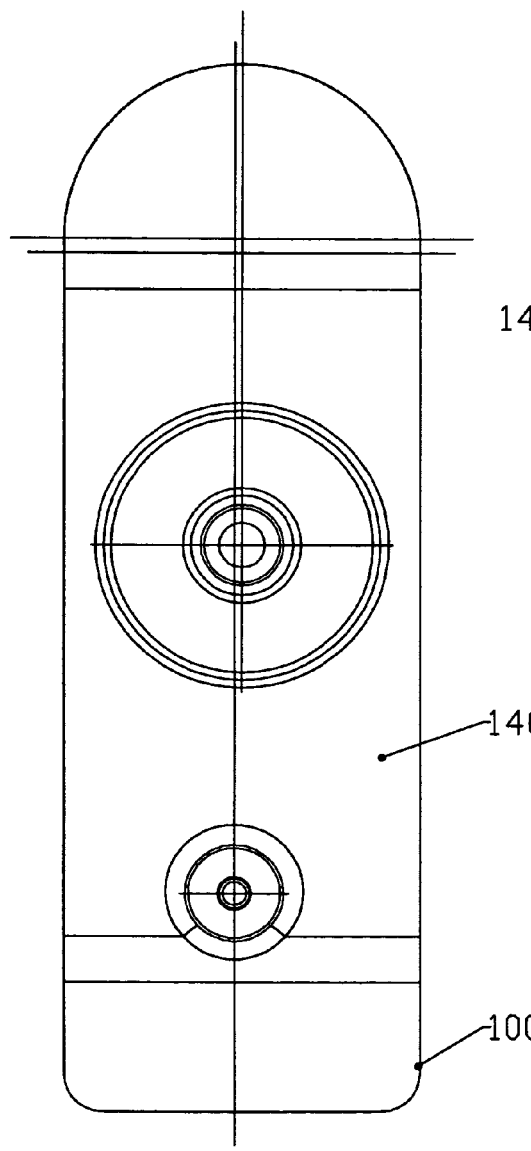
FIG. 3a is a diagram drawing of an external bottom view of an embodiment of the unit.
Figure 3B:
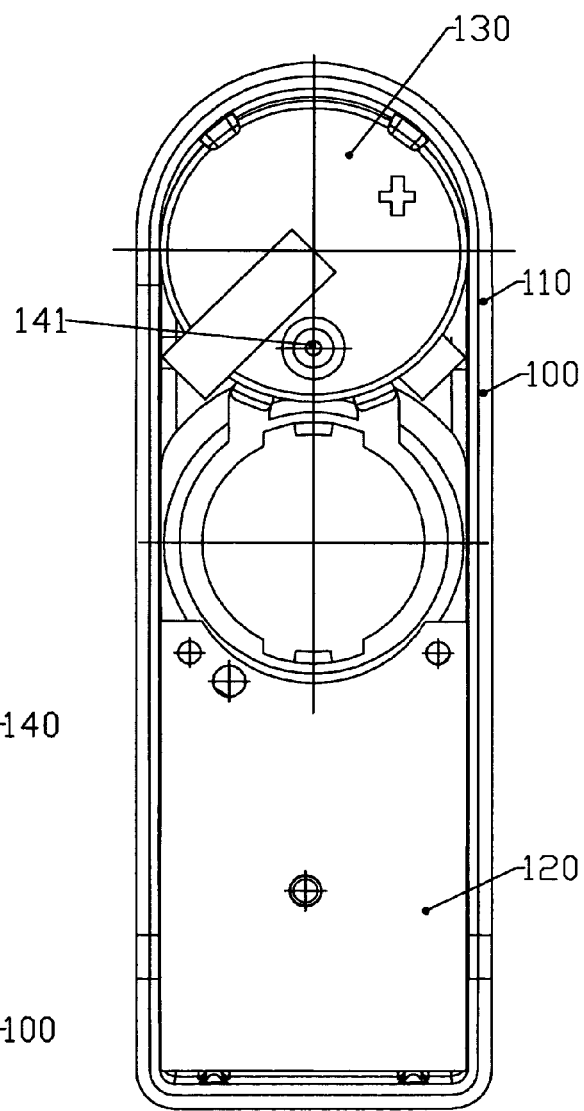
FIG. 3b is a diagram drawing of a bottom view of the unit with its covering removed.

As shown in the drawing of FIGS. 3a and 3b, said unit 100 consists of a receptacle 110 in which the sensors 120 and the various elements necessary for their operation including a battery 130 are positioned, and a cover 140 closing said receptacle 110. According to the embodiment shown, the cover includes means for holding the elements 120 and 130 in position in said receptacle 110.

According to a preferred embodiment, these position holding means consist in particular of modelled resilient means referenced 141 which, when the cover is attached, in this case by being screwed to the receptacle 110, hold the battery in position in its housing. Indeed, said receptacle is preformed to define zones for receiving and positioning the various elements that it receives.

According to another feature, the material used for the receptacle and for the cover, as well as the lugs for producing these two elements enable an almost sealed connection to be formed between them.

This containment associated with the position holding means has a number of advantages, including the following:

It prevents the elements of the receptacle from being embedded in a polymer material and allows for a resulting weight increase which significantly reduces the stresses to which the attachment assembly of the invention is subjected.

The absence of polymer material enables the unit to be repaired and recycled.

The absence of polymer material allows for better use of the radiofrequency technology, which is conventionally used to transmit the parameters measured from the wheel to the receiving and processing subassembly.

The design of the means for receiving the battery 130 and holding it in position was an area to which the inventor gave special attention. Indeed, for good autonomy, the negative pole of flat and round batteries must not be subjected to compression or stress.

Thus, according to a particularly advantageous feature, the means for receiving the battery include at least two stops, defined, for example, by two inclined planes, with which a circular edge of the cylindrical structure conventionally forming the positive pole of such a battery comes into contact. The contact between the battery and the single "positive" structure prevents any pressure force on the portion defining the negative pole. According to this feature, the resilient positioning means also come into contact with the structure defining the positive pole of the battery in opposition to the surfaces defined by the inclined planes.

According to another particularly advantageous feature, the means for receiving the battery include at least one positioning "V" on the two branches on which the two circular edges of the cylindrical structure conventionally forming the positive pole of such a battery are positioned.

This embodiment shown by the drawing of FIG. 4 has an assembly that adopts the features of the invention while modifying them for an application in which the valve can be integrated into the rim 200 only by the side thereof.

According to the invention, this assembly includes:
a detection unit 100 receiving detection components and the elements necessary for their operation,
a valve body 300,
sealing means 400 providing a seal between the valve body 300 and the rim 200,
means 500 for holding the valve body 300 in position on the rim 200 which is preformed with an aperture 210 allowing the valve body to be inserted,
a connection module, in this case also partially merging with the position holding means 500, for connecting the detection unit 100 to the valve body 300.

According to the invention, the assembly is remarkable in that one of the assembly elements aside from the seal is preformed so that a portion of this element penetrates the aperture 210 provided in the rim 200.

This element in this case consists of a subassembly 700 of the connection module which acts as an insertion part between resilient means 600 belonging to the connection module and in contact with the internal surface of the rim and the unit that comes into contact with the head 540 of the threaded sleeve 500 ensuring that the valve body 300 is held in position. The lower portion of this insertion part 700 comprises a shoulder that allows it to have an axial contact surface 710 for the resilient means 600, which in this case are constituted by a spring washer, and a radial cylindrical contact surface 720 penetrating the aperture 210.

This different integration of the valve body requires a different connection between the valve body 300 and the unit 100. Thus, the connection means do not pass through the unit 100 at the level of its plane of symmetry, but are connected to it by means of a plate projecting from its side and through which the threaded sleeve 500 passes.

In addition, in this embodiment, the surfaces of the sleeve and of the unit coming into contact are preformed so as to form a rounded contact surface to enable the unit to come into sliding contact in every case with the internal surface of the rim 200.

The same applies to the contact surfaces between the unit and the insertion part 700 fitted on the rod formed by the valve body 300.

According to a particularly advantageous feature, the curved surfaces formed by said contact surfaces are slightly eccentric so as to allow for positioning of the unit according to two dimensions.

It is understood that the assembly described above and shown in the figures was done so in order to provide a disclosure rather than to specify a limitation. Of course, various arrangements, modifications and improvements can be made to the example given above, without going beyond the scope of the invention as defined in the claims.

Thus, for example, the assembly element of which a portion penetrates the aperture of the rim can be formed by the valve body itself, in which a change in diameter can provide the support for said tangential forces.

The invention claimed is:

1. An assembly (M) of a detection unit (100) inside a tyre attached to the body (300) of a valve (V), the tyre having a rim (200), comprising:
   a detection unit (100) receiving detection components,
   a valve body (300),
   a seal (400) for providing a seal between the valve body (300) and a rim (200),
   means (500) for holding the valve body (300) in position on the rim (200) which is preformed with a connection aperture (210),
   a module for connecting the detection unit (100) to the valve body (300), wherein at least one of the group consisting of the detection unit (100), the valve body (300), the means (500) for holding the valve body (300), or a combination thereof, is preformed to penetrate the connection aperture (210) so as to engage the connection aperture (210) when the assembly (M) is subjected to tangential stresses.

2. The assembly (M) according to claim 1, wherein said valve body (300) includes an external shoulder (310) with which said seal (400) comes into contact, with the holding means (500) being placed inside and coming into contact with an internal surface of the rim (200), in order to hold the seal (400) securely between the aperture (210) and the valve body (300).

3. The assembly (M) according to claim 1, wherein said seal (400) comes into contact with an external surface of the rim (200).

4. The assembly (M) according to claim 2, wherein said holding means (500) comprises a threaded connection between the valve body (300) and a nut that, coming into contact with the internal surface of the rim (200), holds, by means of a relative rotation of the threaded body (300) with respect to the nut, the seal (400) securely between the aperture (210) and the valve body (300).

5. The assembly (M) according to claim 2, wherein said external shoulder (310) is preformed so as to create surface (311) for axial contact with the internal surface of the rim (200) and opposing screwing forces, and a receiving space (312) in which the seal (400) can be deformed.

6. The assembly (M) according to claim 1, wherein the module for connecting the detection unit (100) to the valve body (300) includes a sleeve which engages the valve body (300), which sleeve has a low portion that is preformed not only to have an axial contact surface (510) for holding the valve body (300) on which it is screwed in position, but also to have a radial contact surface (520) which performs a cylindrical penetration in the connection aperture (210).

7. The assembly (M) according to claim 6, wherein said sleeve includes a head (540) with a shoulder (541) which acts as a contact surface for said detection unit (100).

8. The assembly (M) according to claim 6, wherein said sleeve is threaded so as to be screwed on the valve body (300).

9. The assembly (M) according to claim 7, further comprising a resilient means (600) that tends to hold the detection unit (100) in contact with the head (540).

10. The assembly (M) according to claim 9, wherein said head (540) is preformed at a level of its surface (541) in contact with the detection unit (100) to provide a corrugated portion cooperating with notches provided in the detection unit (100) so as to limit the rotational movements of the detection unit (100) with respect to said sleeve (500).

11. The assembly (M) according to claim 1, wherein said detection unit (100) comprises a receptacle (110) in which sensors (120) and the sensor elements (130) necessary for operation of sensor 120 are positioned, and a cover (140) closing said receptacle (110).

12. The assembly (M) according to claim 6, wherein an end of the sleeve penetrating the aperture (210) provided in the rim (200) is chamfered (530) at a level of an internal aperture of the rim 200.

13. The assembly (M) according to claim 6, wherein axial contact surface (510) and the radial contact surface (520) of the sleeve and the detection unit (100) coming into contact are preformed so as to form a curved contact surface to enable the detection unit (100) to come into contact with an internal surface of the rim (200).

14. An assembly (M) of a detection unit (200) for placement inside a tire having a rim (200), the assembly comprising:
   a detection unit (100) having detection components;
   a valve body (300);
   a seal (400) located between the valve body (300) and a rim (200) having a connection aperture (210);
   a fastener (500) to hold the valve body in position on the rim (200); and
   wherein at least one of the group consisting of the detection unit (100), the valve body (300), the fastener (500), or a combination thereof, penetrates the connection aperture (210) and engages the connection aperture (210) when the assembly is subjected to tangential stresses.

* * * * *